Figure 3:
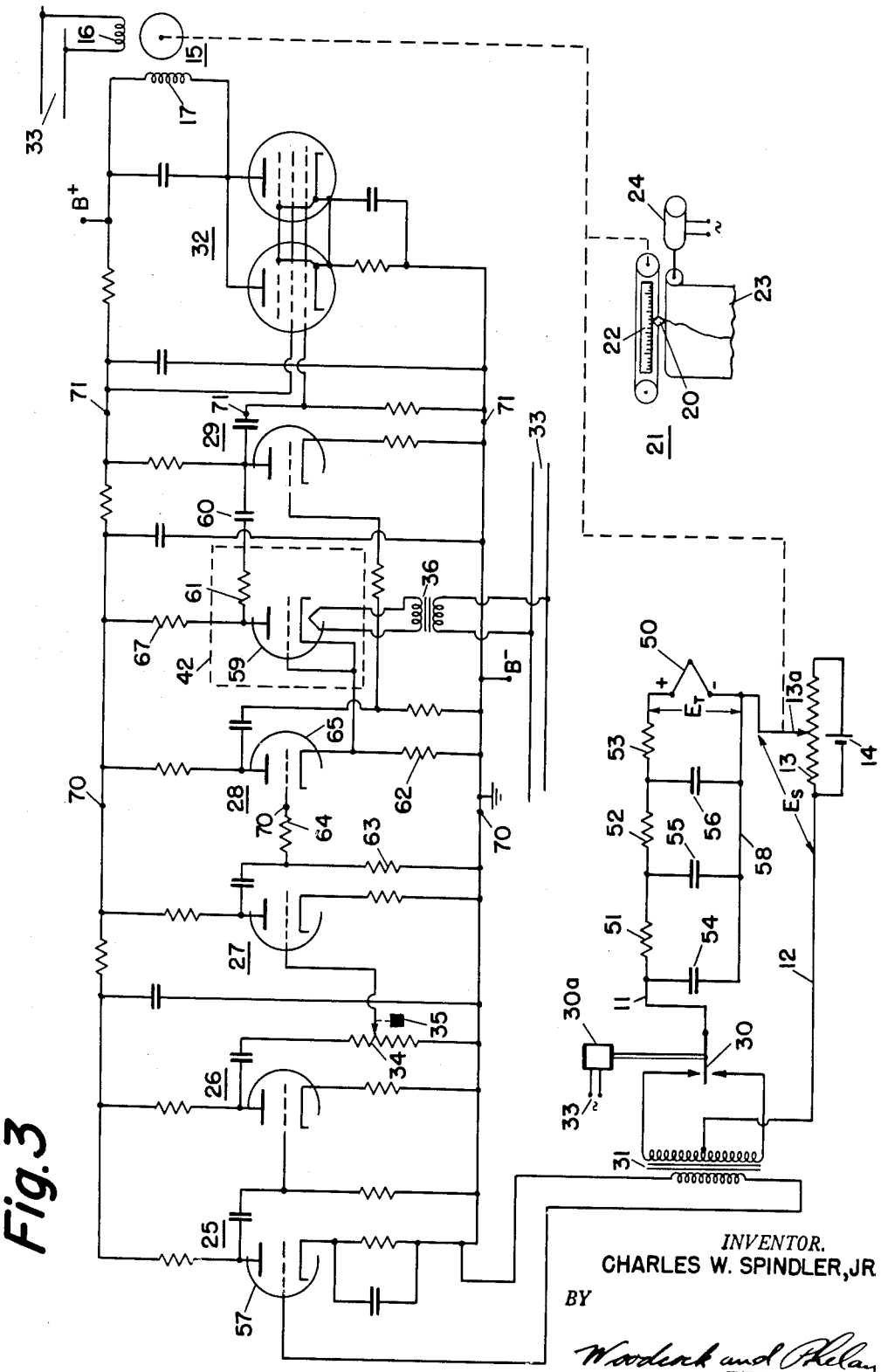

May 1, 1956     C. W. SPINDLER, JR     2,744,227
COMPENSATED NULL-BALANCE SERVO SYSTEM
Filed March 12, 1953     3 Sheets-Sheet 1

*Fig. 1*

*Fig. 2*

INVENTOR.
CHARLES W. SPINDLER, JR.
BY
Woodcock and Phelan
ATTORNEYS

May 1, 1956  C. W. SPINDLER, JR  2,744,227
COMPENSATED NULL-BALANCE SERVO SYSTEM
Filed March 12, 1953  3 Sheets-Sheet 2

INVENTOR.
CHARLES W. SPINDLER, JR
BY
Woodcock and Phelan
ATTORNEYS

United States Patent Office 2,744,227
Patented May 1, 1956

2,744,227

COMPENSATED NULL-BALANCE SERVO SYSTEM

Charles W. Spindler, Jr., Norristown, Pa., assignor to Leeds and Northrup Company, Philadelphia, Pa., a corporation of Pennsylvania Application March 12, 1953, Serial No. 341,853

11 Claims. (Cl. 318—432)

This invention relates to improvements in null-balance servo systems of the type including recorders, controllers and indicators and has for an object the provision of means for eliminating the effect upon the operation of such systems of fluctuations of line voltage.

Though not necessarily limited thereto, the invention is particularly useful in servo systems of the null-balance type which include a transducer, generally in the form of a balancing motor, for adjusting a circuit component in response to change of an input signal to return the system to balance. If the system is to respond to exceedingly small changes in the characteristic being measured and, hence, to error signals of a very low order of magnitude then it should have high sensitivity. In meeting this requirement, there are provided amplifiers with high gain and adequate for the development of an output for operation of the transducer or motor in response to an error or input signal of a desired lower order of magnitude.

When it is realized that servo systems of the foregoing type are designed for operation with input signals of the order of 100 microvolts for full-scale operation and with a desired sensitivity of one-tenth of one percent of full range, it will be seen that there must be adequate gain in the amplifier to raise a minute input voltage to an output voltage of, say, 20 volts for an unbalance or error signal only one-tenth of one percent of the full-scale range. In many systems it is convenient to utilize a potentiometer in the form of a variable resistor generally referred to as a slidewire in order to develop a balancing voltage which opposes a voltage whose magnitude varies with the change in the condition under measurement. Many slidewires are in the form of a closely wound helix supported on a disc and movable relative to a stationary contact. The movement of the slidewire from one turn to an adjacent turn will then represent the minimum change in potential which can be produced by an adjustment of the slidewire. Accordingly, if the sensitivity be too high, the transducer will move the slidewire in a direction to reduce the error signal, but the movement of the slidewire for a minimum change in potential will result in over-compensation, and the system will "hunt," i. e., will function to move the slidewire back and forth between the two turns.

Where the sensitivity is high, the application to the amplifier of a signal many times that of a minimum signal which will produce slidewire movement will also be subject to the full amplification provided, and thus the output of the amplifier for the stronger signals will be exceedingly high. The rate of change of output with increasing input signals in part depends upon the gain of the amplifier, and if the rate of change of output is excessive, instability in operation will be introduced for the reason that a small change in the input signal will produce an output so high that there will be a greater movement of the slidewire than will be needed to return the system to balance. Accordingly, it will be seen that for stable operation with maximum sensitivity the rate of change of the output of the amplifier with varying input signal cannot exceed the capabilities of the system.

With the output of the amplifier applied to a motor winding, the motor also having a power winding, the torque developed by the motor will be proportional to a product of the voltage output of the amplifier and the voltage applied to the power winding. Thus, the rate of change of torque on the motor with a constant voltage on the power winding will be proportional to the rate of change of the output of the amplifier. It follows then that a change in voltage on the power winding will change the torque in the same way as though there were a change in the output of the amplifier.

In practice it has been found that with commercial sources of alternating-current supply, particularly when heavy loads are connected and disconnected therefrom, fairly wide swings of voltage occur. With the power winding connected to such supply lines, fairly wide changes in torque have occurred, and frequently have introduced instability into the operation of servo systems.

In accordance with the present invention, satisfactory operation of servo systems is attained without need of providing regulation of the alternating-current supply for the power winding, but by varying the output of the amplifier in direction and to extent to compensate for changes in the motor torque which would otherwise occur due to changes in the line voltage applied to the power winding. Though adjustments of the amplifier may be attained in many different ways, in a preferred form of the invention there is provided a gain-controlling means within the amplifier operable in accordance with change in line voltage to vary the output in sense and to extent needed to maintain the rate of change of torque within the required limits.

Figure 4:
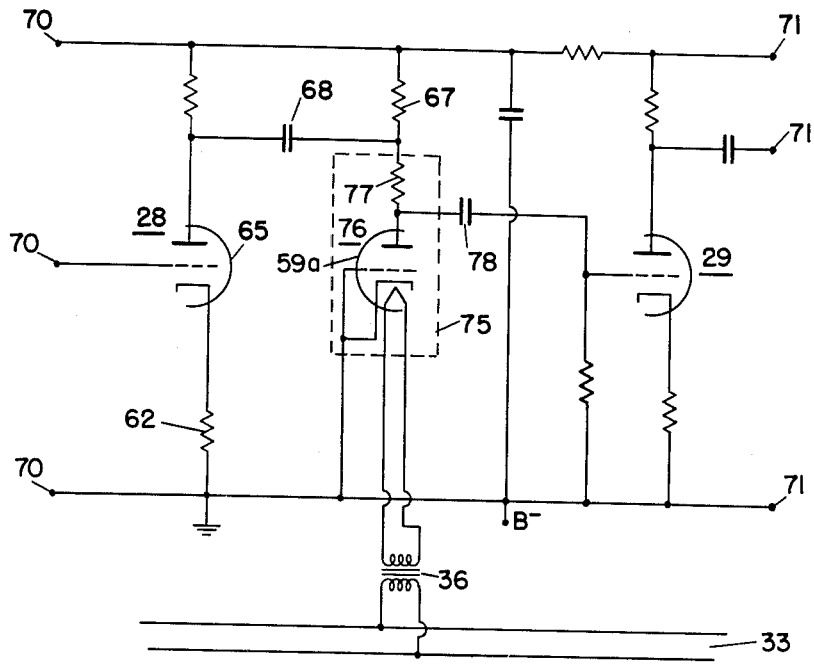

For further objects and advantages of the invention and for other ways of carrying out the same, reference is to be had to the following detailed description taken in conjunction with the drawings, in which:

Fig. 1 diagrammatically illustrates the invention in block diagram;

Fig. 2 is a graph explanatory of the operation of the invention;

Fig. 3 diagrammatically illustrates a preferred embodiment of the invention; and Fig. 4 diagrammatically illustrates another embodiment of the invention.

Referring to the drawings wherein like reference characters designate like parts, Fig. 1 illustrates a typical application of the invention to a null-balance system which may be used for the measurement or control of a selected condition, electric, mechanical or physical, arranged to produce an electrical output varying with change in magnitude of said condition. Such a system includes a device 10 arranged to develop a potential difference or voltage $E_T$ in an input circuit traced by way of conductors 11 and 12. The input circuit also includes a variable resistor or slidewire 13 relatively adjustable with respect to an associated contact 13a. The resistor is energized by any suitable means, as by a battery 14. While the resistor may be rotated relative to the contact, or vice versa, the contact, as a matter of convenience, has been shown as adjustable relative to the resistor as by a mechanical connection illustrated by the broken line extending from the contact 13a to the rotor of an electric motor 15. The motor 15 is provided with a power winding 16 and a control winding 17. The arrangement is such that upon change in magnitude of the voltage $E_T$ by device 10, the motor 15 is energized in a direction to move contact 13a relative to slidewire 13 to change the voltage introduced into the input circuit by an amount equal and opposite to $E_T$, thus to reduce to zero the error signal developed across input conductors 11 and 12. The input circuit also includes a resistor 18 across which is connected a tachometer-generator 19 having a permanent magnetic field 19a. The tachometer-generator 19 introduces into the input circuit a component proportional to the speed of motor 15 for purposes hereinafter fully explained.

As contact 13a of slidewire 13 is adjusted a pen-index 20 of an indicator-recorder 21 is moved relative to a scale 22 and a chart 23 to indicate on the scale the magnitude of the condition and to leave on the chart a continuous record thereof. The chart is driven at constant speed by any suitable means, such for example as a synchronous motor 24.

Inasmuch as the potential difference Es introduced into the input circuit by the section of slidewire 13 below contact 13a opposes in that circuit the voltage or potential difference developed therein by the device 10, it will be understood that only the difference-voltage will appear across conductors 11 and 12. It will further be understood that as soon as an input signal appears across the input circuit, the motor 15 will be energized to drive the contact 13a in a direction to reduce the error signal. Accordingly, it can be anticipated that the input signal will in general be of a low order of magnitude and that, for high sensitivity, amplification will be needed.

Accordingly, suitable amplifier stages may be provided, five of them, 25–29, being shown in the block diagram. Because of advantages in amplifying alternating current the input signal is, by any suitable means such as a converter 30 and an input transformer 31, converted to alternating current which is applied to the first voltage amplifying stage 25 of the system. After a final voltage amplification provided by stage 29, the output is applied to a power amplifier stage 32, the output circuit of which includes the control winding 17 of motor 15. The control winding 17 will be energized with alternating current of the same frequency as that supplied to the power winding 16 from alternating-current supply lines 33. The voltages applied to the windings 16 and 17 differ in phase by 90°, and thus when the control winding 17 is energized a torque is developed to produce rotation of motor 15 and in a direction dependent upon whether the voltage applied to the winding 17 leads or lags that applied to winding 16.

If the potential of $E_T$ is less than Es, the motor will be energized for rotation in a direction to reduce Es. However, when $E_T$ is greater than Es the polarity of the input signal reverses and this produces 180° reversal of phase of the voltage applied to the motor winding 17, and thus the motor 15 is energized for rotation in the reverse direction and to increase the value of Es in the input circuit. The torque developed by the motor is proportional to the product of the voltage $E_{16}$ applied to power winding 16 and the voltage $E_{17}$ applied to control winding 17. Mathematically, torque equals $KE_{16}E_{17}$ where K is a proportionality constant. The minimum torque required to produce rotation of motor 15 will be that necessary to overcome the inertia, friction and the like, of all moving parts connected thereto. Thus, there will be required upon the control winding 17 an alternating current voltage of predetermined amplitude before the motor 15 will rotate in one direction or the other. In terms of the error signal there will likewise be required a voltage input which will produce the minimum energization of control winding 17 to initiate rotation. If this signal be quite small, the system will have high sensitivity. The system has high sensitivity if there be adequate gain by reason of the voltage amplifying stages 25–29. With but three stages, an unbalance signal of only 500 microvolts on the input circuit will develop 20 volts across the control winding 17 of the motor. With greater amplification, as provided by the five stages shown, a like output can be obtained with an input signal of the order of 0.2 microvolt. When it is considered that a voltage of approximately 20 volts across the control winding 17 will initiate rotation of motor 15, it will be understood the degree of sensitivity which can be readily provided for the system.

When operating with high sensitivity and high gain there is an ever-present danger of instability in the system. When it is considered that the system must respond to unbalance signals measured in microvolts (and in some cases, fractions thereof), and at the same time must be stable in operation if there be suddenly applied to the input circuit an unbalance signal corresponding with the full range of the instrument, such for example as a voltage of 5 or of 100 millivolts, the nature of the problem involved will be apparent. The direct result of high sensitivity is that maximum voltage is applied to the control winding 17 with an error signal but a few percent of full range. As the sensitivity or gain is decreased, the rate of change of output voltage on control winding 17 with changing input signal is decreased.

Graphically, if the torque of the motor 15 be plotted as ordinates, as in Fig. 2, against the input signal varying in opposite directions from zero, the rate of change of torque with change of input signal will correspond with the slope of the graph $T_1$. The rate of change of torque is proportional to the rate of change of output or control voltage when the line voltage $E_{16}$ is constant. As the gain of the amplifier is increased, the slope of the graph $T_1$ in the region of zero input signal will increase and with the gain low, the slope will decrease, for example, as illustrated by the second graph $T_2$. The reason the graphs approach plateaus after the development of predetermined torque on the motor arises as a result of saturation effects in the amplifier. Thus, there is again emphasized the fact that high sensitivity to produce rotation of motor 15 with a small input signal will with a larger input signal produce full output from the power stage 32, and with further increase in input signal the power output will not be further increased. However, the amplifier is designed so that as the power stage 32 approaches saturation the motor 15 is energized for high-speed operation and which has in many instances produced in a balancing operation full-scale movement of the pen-index 20 over a 10-inch chart in as little time as three-quarters of a second.

In normal operation of the system, there is provided a gain control 34 which may be adjusted in any suitable manner as by an adjusting knob 35 so that for any given application of the system the gain can be adjusted to assure stable operation. If, for example, the motor 15 is energized first in one direction and then in the other direction without change of the input signal $E_T$, it will be immediately known that the sensitivity is too high and that the gain should be reduced by operation of knob 35. Such a condition of instability can arise where the potential difference with the setting of the contact 13a on one convolution of the slidewire 13 is slightly less than the voltage $E_T$ and the potential difference with the contact 13a on the adjacent convolution is slightly higher. In such a case the contact 13a would be moved back and forth between the two adjacent convolutions and there would be hunting of the system. Such instability or hunting is avoided by a reduction in the gain so the system will not respond to voltages less than the potential difference between adjacent turns of the slidewire.

Where the convolutions of the slidewire are not present, as where a continuous resistor is used, instability may still occur if on the appearance of a small input signal the motor 15 develops a torque which moves it beyond the balance point. In such a case the motor will be successively energized, each time with excess torque, but will not come to a standstill at the balance point, and the motor will oscillate first beyond and then short of the balance point.

The foregoing considerations apply to the system notwithstanding necessary and desirable provisions for the damping of the motor, that is to say, the provision of means for slowing down the motor prior to the attainment of the final balancing position and to eliminate the effects of inertia which cause the slidewire 13 to overshoot the balancing position. Such a damping device may take the form of a tachometer-generator 19 which develops an output voltage of polarity depending upon the direction of rotation of motor 15 and of a magnitude depending upon the speed. This voltage as applied to the resistor 18 develops a potential difference in the input circuit which brings about a virtual balance short of real balance regardless of the direction in which the unknown voltage $E_T$ may be changing. For example, if $E_T$ is rising, the motor 15 will be immediately energized to move the contact 13a to increase the potential difference $E_S$. The tachometer-generator 19 will then introduce a potential difference by way of the resistor 18 with a polarity cumulative with $E_S$. Thus, $E_S$ plus the potential difference $E_{18}$ across resistor 18 will equal $E_T$ before contact 13a reaches its final balancing position. As the speed of motor 15 decreases with decrease in the input signal, the magnitude of the velocity component $E_{18}$ will decrease, and at standstill that component will be zero and contact 13a of the slidewire will be at the balance point. The magnitude of the damping signal or the voltage varying with the speed of motor 15 is adjusted so that its magnitude properly takes into account the inertia of the moving parts of the system and has proven highly effective in permitting the operation of the system as a whole at high speed and yet without adjustment of the contact 13a short of or beyond the balance point.

Considering now the operation of the system with the gain control 35 set for maximum gain for stable operation, it will be remembered the motor 15 develops a torque of magnitude related to the product of $E_{16}$ and $E_{17}$. If the voltage at the supply lines 33 increases, the voltage $E_{16}$ will likewise increase, and thus the torque of motor 15 for a given energization of the control winding 17 will increase. The net result is the same as though there had been an increase in the gain of the amplifier to provide greater energization of winding 17.

In systems of the type shown in Fig. 1, the various tubes provided in the amplifier are frequently energized from the alternating-current supply lines 33 as by a filament transformer 36 with the filaments of each tube either connected in series as indicated by the filaments 37 and 38, or they may be connected in parallel across the secondary winding. The B supply indicated by the rectangle 40 is also shown energized from supply lines 33, it being understood, of course, that the output terminals B+ and B− supply the direct current needed for the amplifier. Thus, when the system as a whole derives all of its power from the alternating-current supply lines 33, it will be evident that with changes in voltage on those supply lines there may be changes in the operation of the amplifier due solely to such change in voltage effecting a change in filament emission, and change in the voltage in the B supply, these all contributing to a change in the voltage applied to the control winding 17. Thus with the system adjusted for high gain, instability may be introduced solely by change in the voltage of supply lines 33. Where the voltage regulation of the supply lines is poor, as it frequently is in steel mills and other locations where power demands change from time to time by the connection and disconnection of large motors to the power system, the swings in voltage of the supply lines may be very great, as much as 20 volts or 30 volts. With changes of this order of magnitude, changes in the torque on the motor for a given input signal are very large indeed, and have created considerable difficulty by introducing instability or insensitivity into the operation both of the measuring devices and of the control devices at times when their stable or sensitive operation has been deemed of critical importance to the process under measurement or control.

While a voltmeter 41 connected across supply lines 33 could be observed, and while adjustment of gain control knob 35 could be made in the proper direction and to the needed extent to change the gain to compensate for changes in voltage as reflected by voltmeter 41, it is preferred to introduce automatic compensation. Instead of adjusting the gain control 35, a separate gain adjusting device 42 may be provided with utilization of output from a later stage 29 of the amplifier and with modification of the gain of an earlier stage, such as stage 28. Again the adjustment may be manual, as by a knob 43, or it may be fully automatic as shown more in detail in Fig. 3.

Referring now to Fig. 3, the voltage amplifying stages 25–29 are conventional in design and with circuit components selected for high gain and in relation to the characteristics of the amplifying tubes included in the amplifier. They may be, for example, of the type 12AX7, dual triodes, and the type 6AQ5 may be used in the power stage 32. Tubes of the type 6SQ7, 6L7 and 12SL7 are also satisfactory for the voltage amplifying stages, and tubes of the 6L6 type may be used in the power stage.

In Fig. 3 the unknown voltage $E_T$ is shown as developed by a thermocouple 50. The voltage $E_T$ is opposed in the input circuit by the potential difference $E_S$ developed by the slidewire 13. Included in the input circuit is a filter including resistors 51–53 and capacitors 54–56. The filter is preferably designed greatly to attenuate 60-cycle alternating current and thus to minimize stray field pickup before application of the difference-voltage to the converter 30. The converter 30 is shown as including a pair of stationary contacts respectively connected to opposite ends of the primary winding of a transformer 31, the primary winding having a center tap to which conductor 12 is connected. The secondary winding of transformer 31 is connected directly to the input circuit of the first amplifying stage 25 including a tube 57.

In Fig. 3 damping is provided by a resistor-capacitor combination. The action will first be described in terms of resistor 51 and capacitor 54. With the system in operation it will, of course, be understood that the operating coil 30a of the converter 30 will be energized from supply lines 33 (the same supply lines from which the motor power winding 16 receives power) and that the converter 30 is of the polarized type to produce an alternating-current signal in the primary winding of the same frequency as that of supply lines 33 and usually 60 cycles per second. The periodic operation of converter 30 serves first to connect the difference-voltage across conductors 11 and 12 across the upper half of the primary winding and then across the lower half of the primary winding. The reversal of current flow in the primary winding produces the alternating current in the secondary winding. The converter may be of the normally closed contact type or of the normally open type, and in either case there will be between conductors 11 and 12 a fairly low impedance or resistance which may be designated as $R_D$. If the temperature on thermocouple 50 changes, there will be a change of voltage $E_T$ which will produce a current flow through first one and then the other half of the primary winding. The change in $E_T$ causes energization of the motor 15 which then moves the slidewire contact 13a to decrease the error voltage on the input signal. It will be observed that as soon as the voltage $E_S$ changes a current is provided by way of a conductor 58 and capacitor 54 through the primary winding of transformer 31, the return path being by way of conductor 12. Thus, the greater flow of current through first one half and then the other half of the primary winding through the path which has just been traced means that the output signal of the transformer 31 has been increased over and above what it would be in the absence of the current path provided by way of capacitor 54. The magnitude of the current flow through the path including capacitor 54 will depend upon the rate of change of $E_S$ and that, in turn, will depend upon the speed of motor 15 or the speed with which contact 13a is moved relative to slidewire 13. Accordingly, the increased current flow through the detector or converter introduces a damping component proportional to $$C\left(\frac{dE_s}{dt}\right)$$

Thus, the damping action is comparable to, and the equivalent of, the tachometer damping action described in the modification and block diagram of Fig. 1. While the capacitors 55 and 56 also contribute to the damping action, it will be seen that the added current flow through them is diminished by reason of the inclusion in the circuit of the resistors 51 and 52.

With the system of Fig. 3 provided with the damping control, the sensitivity or gain will be adjusted by the gain control device 34, shown in the form of a potentiometer having a knob 35 for changing its position along the resistance 34. The gain controller may be included in any desired part of the system, and it has been shown between the second and third stages as one satisfactory location.

It is to be noted that if the gain of the amplifier be greatly reduced, the effectiveness of the damping component is decreased. Accordingly, the motor will coast beyond the balancing position and there will be overshoot. Thus, to prevent overshoot the gain must be maintained fairly high, and yet if it is too high there will be the instability mentioned above.

As already explained, the sensitivity will be adjusted until the motor 15 will be energized for a selected difference-voltage as appearing between conductors 11 and 12. In general, for a given operation the sensitivity will be adjusted until there is instability of operation, and the sensitivity will then be reduced slightly below the amount needed for stable operation.

To prevent instability or insensitivity as a result of changes in the amplitude of the voltage on supply lines 33 and upon the power winding 16, the gain-adjusting device 42 in Fig. 1 has been illustrated as comprising a diode which may be of any conventional type or a rectifier of the triode type, but as shown comprises one half 59 of a twin triode which has its grid directly connected to cathode for operation as a diode. Output from the fifth voltage amplifying stage 29 is applied by way of a coupling capacitor 60 and resistor 61 to the anode of the tube 59, the return path being by way of a biasing resistor 62 included in the cathode circuit of the preceding energizing stage 28. Thus, the signal applied to the tube 59 flowing through the bias resistor 62 will apply a degenerative A. C. voltage to stage 28. The upper limit of the degenerative A. C. voltage is determined by the value of the fixed resistor 61. This signal will change with change in the output signal from stage 29 and thus provides negative or degenerative feedback action during normal operation of the system. A certain amount of negative feedback is desirable in reducing saturation of the amplifier. Combined with the negative feedback action is the compensating action for a change in line voltage of the supply lines 33. From these lines 33 through filament transformer 36 the filament of tube 59 is energized. The conductivity of tube 59 varies with the temperature of the filament, and this, in turn, depends upon the voltage applied to it.

It has been found in practice that the time delay involved in changes in emission from the cathode of tube 59 with changes in voltage is satisfactory to avoid upsetting the amplifier by reason of rapid change in gain and, at the same time, varies the gain of the amplifying stage 28 in amount such that the output of power stage 32 as applied to control winding 17 maintains substantially constant over a wide range of line voltage the rate of change of torque of motor 15, or for input signals below saturating level maintains substantially constant torque mathematically expressed as the product of $KE_{16}E_{17}$. The mathematical expression for the rate of change of torque may be expressed as:

$$\frac{\partial T}{\partial t} = \frac{e_{16}\partial e_{17}}{\partial t} + \frac{e_{17}\partial e_{16}}{\partial t} = C$$

where $e_{16}$ and $e_{17}$ are respectively the instantaneous values of $E_{16}$ and $E_{17}$.

While the negative feedback action has been shown as applied only to the tube 28, it is to be understood, of course, that the same action may be applied to more than one stage of the amplifier.

When the negative feedback action of the latter type is not desired a gain adjusting device 75 (Fig. 4) may be used to compensate for variations in line voltage. The circuitry of Fig. 4 may replace that portion of the amplifier illustrated in Fig. 3 between points 70 and 71. The gain adjusting device 75 is comprised of voltage divider connected between voltage amplification stages 28 and 29. The voltage divider 76 is connected from the plate of tube 65 to ground and is comprised of a fixed impedance 77 and a variable impedance, which may be a vacuum tube 59a, which is the equivalent of tube 59 illustrated in the embodiment of Fig. 3. The grid of vacuum tube 29 is connected by way of a D. C. blocking capacitor 78 to the voltage divider 76, between the fixed impedance 77 and the variable impedance 59a, and therefore the magnitude of an A. C. signal appearing at the grid of tube 29 will be determined by the voltage drop across the variable impedance of tube 59a. The plate supply for tube 59a may be by way of resistor 67 or if desired may be derived by direct connection from the plate of tube 28, which would eliminate the resistor 67 and capacitor 68.

As described above the plate resistance of a diode will be affected by the degree of emission from the cathode thereof which in turn will be determined by the extent of filament voltage.

With this in mind it will be observed that the A. C. signal from stage 28 to stage 29 will be varied in accordance with the degree of emissivity from the cathode of tube 59a which in turn is determined by the voltage applied to the filament thereof by way of filament transformer 36 connected across supply lines 33. Variations in line voltage as described above will cause an inverse change in the magnitude of the signal appearing at the grid of stage 29. For example as the line voltage increases the emission from the cathode of tube 59a will be increased thereby to lower the plate resistance of that tube which will decrease the value of the A. C. signal appearing at the grid of stage 29. The reverse will be true in the event of a decrease in line voltage. The action of the voltage divider will be such as to vary the signal appearing at the grid of stage 29 in amount so that the output of power stage 32, as applied to control winding 17 maintains substantially constant over a wide range of line voltage the rate of change of torque of motor 15.

Where faster response is desired, or in lieu of dependence upon thermal emission changes with change in energization thereof, a heater may be provided in thermal relation with resistor 61 (Fig. 3) having a negative temperature coefficient of resistance and the heater energized directly from supply lines 33. Thus, with voltage increasing upon supply lines 33, the resistance because of the increase in temperature would decrease, the feedback would increase and the torque developed by the motor 15 would be correspondingly decreased.

Further in accordance with the invention, the change in amplification or sensitivity of the amplifier is not linear with change in voltage on the supply lines. This follows from the fact that the torque developed by the motor 15 is a power function, and it is well known that that function is not linear and requires that if the torque shall be maintained constant for any given value of input signal there shall be more than a linear compensation by way of change in gain of the amplifier.

Obviously, many modifications and variations of the present invention are possible in the light of the above

What is claimed is:

1. A control system for a transducer including at least two windings for producing torque upon energization of said windings comprising an amplifier having an input circuit for receiving a signal voltage and having an output circuit across which an amplifier output voltage is developed, means for applying to one winding of said transducer said output voltage, means for applying to the other winding of said transducer a second voltage, and means responsive to change in the magnitude of said second voltage for changing the amplitude of said amplifier voltage in direction and to the extent needed to maintain substantially constant, for a given signal voltage applied to said input circuit, the magnitude of the torque developed by said transducer.

2. The combination of claim 1 wherein the means responsive to change in the magnitude of said second voltage is a feedback circuit.

3. The combination of claim 2 wherein the feedback circuit includes a variable impedance for changing the feedback in a manner directly proportional to the change in magnitude of the second voltage.

4. A control system for a transducer including at least two windings for producing torque upon energization of said windings comprising an amplifier having an input circuit for receiving a signal voltage and having an output circuit across which an amplifier output voltage is developed, means for applying to one winding of said transducer said output voltage, means for applying to the other winding of said transducer a second voltage, a feedback circuit including means responsive to change in the magnitude of said second voltage for changing the amplitude of said amplifier voltage in direction and to the extent needed to maintain substantially constant, for a given signal voltage applied to said input circuit, the magnitude of the torque developed by said transducer, said means comprising an impedance whose resistance changes with temperature, and means for varying the temperature of said impedance in accordance with variations in said second voltage.

5. The combination of claim 4 wherein said impedance is a vacuum tube serially connected in said feedback circuit and having a filament voltage applied thereto which varies with the second voltage.

6. The combination of claim 4 wherein the feedback circuit includes a fixed impedance determining the upper limit of feedback magnitude.

7. The combination of claim 4 wherein said impedance is a diode serially connected in said feedback circuit, and having a cathode whose emissivity varies with temperature change to produce changes in the resistance of said diode.

8. A control system for a transducer of the type which develops a torque varying with the amplitude of alternating current energization applied thereto comprising an amplifier having an input circuit for application thereto of a signal voltage and having an output circuit across which there is developed an amplifier output voltage for controlling the energization of said transducer, alternating current supply lines for said amplifier, said amplifier being of the type in which a change in the voltage across said supply lines produces a change in said amplifier output voltage, gain-controlling means for said amplifier, and means responsive to change in the voltage across said supply lines from a predetermined value for operating said gain-control means in a direction to change said amplifier output voltage by the amount required for the development by said transducer of substantially the same torque each time an input signal of given amplitude is applied to said input circuit, change in the amplitude of said input signal producing changes in the amplitude of said amplifier output signal unaffected by said gain-control means.

9. A control system for a transducer including at least two windings for producing torque upon energization of said windings comprising an amplifier having an input circuit for receiving a signal voltage and having an output circuit across which an amplifier output voltage is developed, means for applying to one winding of said transducer said output voltage, means for applying a second voltage to the other winding of said transducer, and a voltage-divider comprising a pair of serially connected impedances, one of said impedances being fixed in value and the other of said impedances being variable in response to change in the magnitude of said second voltage for changing the amplitude of said amplifier voltage in direction and to the extent needed to maintain substantially constant, for a given signal voltage applied to said input circuit, the magnitude of the torque developed by said transducer.

10. The combination of claim 9 wherein said variable impedance is a vacuum tube having a filament voltage applied thereto which varies with said second voltage.

11. A control system for a transducer including at least two windings for producing torque upon energization of said windings comprising an amplifier of at least two stages having an input circuit for receiving a signal voltage and having an output circuit across which an amplifier output voltage is developed, means for applying to one winding of said transducer said output voltage, means for applying to the other winding of said transducer a second voltage, each of said stages including a vacuum tube having a plate and a cathode, and means responsive to change in the magnitude of said second voltage for changing the amplitude of said amplifier voltage in direction and to the extent needed to maintain substantially constant, for a given signal voltage applied to said input circuit, the magnitude of the torque developed by said transducer, said means comprising a feedback circuit connected from the plate circuit of one stage to the cathode circuit of the other stage and including serially connected impedances, one of said impedances being variable in response to the change in magnitude of said second voltage.

References Cited in the file of this patent

UNITED STATES PATENTS

| | | |
|---|---|---|
| 1,851,692 | Zucker | Mar. 29, 1932 |
| 2,528,512 | Greenough | Nov. 7, 1950 |
| 2,656,498 | Goodwin | Oct. 20, 1953 |
| 2,656,499 | Goodwin | Oct. 20, 1953 |

FOREIGN PATENTS

| | | |
|---|---|---|
| 550,743 | Great Britain | Jan. 21, 1943 |